Oct. 10, 1961 A. J. GILISSEN 3,004,131
WARMER STOVE
Filed July 17, 1959
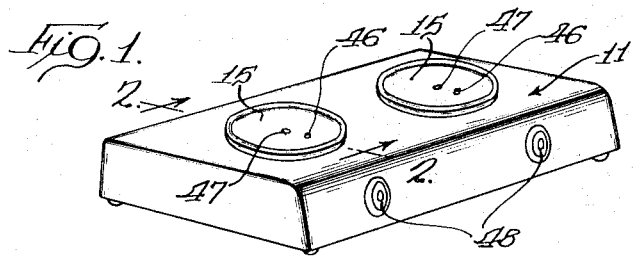
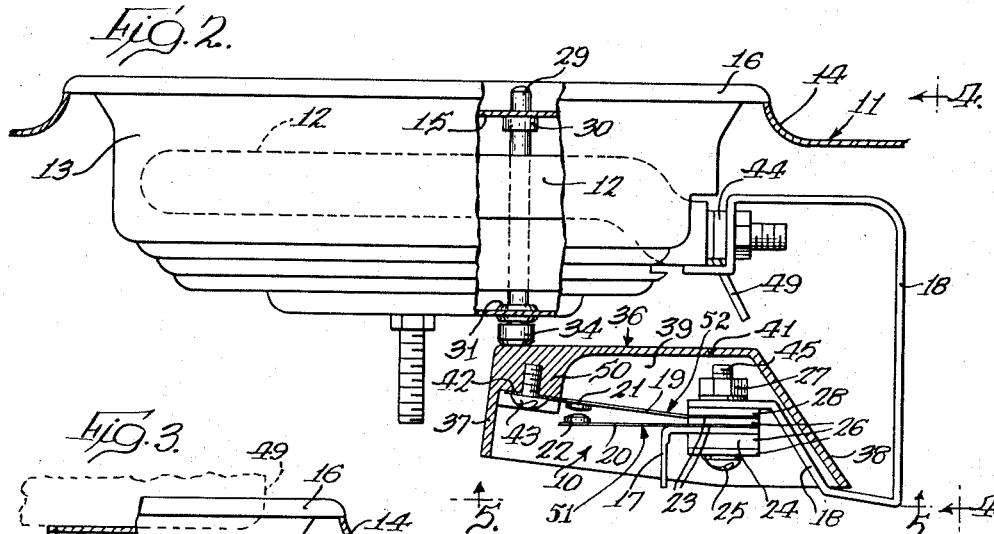
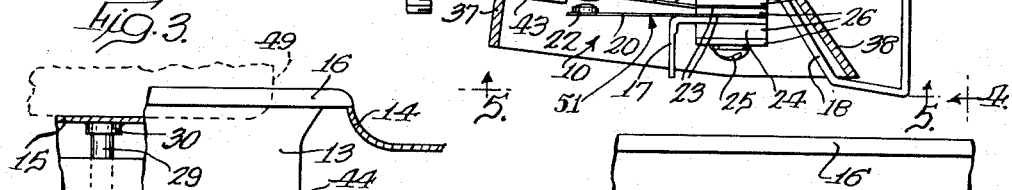
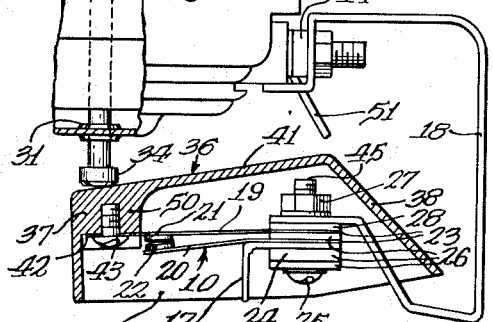
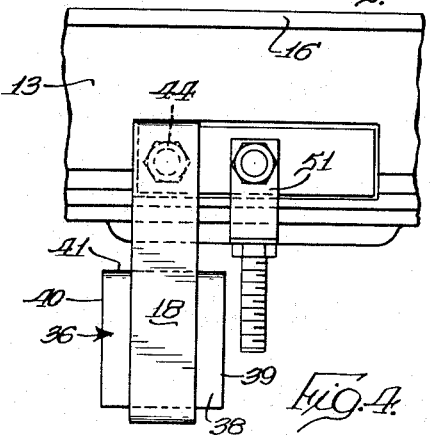
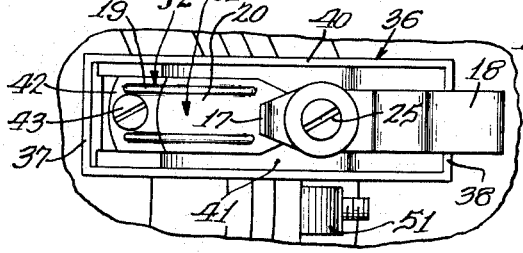
INVENTOR.
Aart J. Gilissen United States Patent Office 3,004,131
Patented Oct. 10, 1961

3,004,131
WARMER STOVE
Aart J. Gilissen, Chicago, Ill., assignor to Cory Corporation, a corporation of Delaware
Filed July 17, 1959, Ser. No. 827,763
9 Claims. (Cl. 219—37)

This invention relates to an electrical heating device and more particularly to a plunger actuated switch of the type adapted for controlling an electric heating element employed in such a device.

In the daily operation of a restaurant or even a domestic kitchen it is desirable to prepare beverages such as coffee in a quantity larger than can be consumed immediately following preparation. It is therefore important to restrain the remaining preparation at a servable temperature not only to have an instant supply but also to keep the proper flavor of the beverage.

A common heating means for meeting the above need incorporates a switch actuated by a plunger depressible by beverage decanters or vessels placed thereon. This switch relieves operators from the burdensome task of manually controlling the heating element during varying conditions. However, it has been found that in the course of such carefree operation, spilled coffee and other debris leaked through to the switch to clog further automatic operation. This problem has remained quite distressing since openings in the stove framework must be made for the plunger which in turn must have direct access to the movable members of the switch. The present invention obviates the above difficulty by providing a protective enclosure integrally mounted on one movable contact member of the switch.

The principal object of the present invention is to provide a new and improved plunger actuated switch adapted for use in a beverage warming stove.

Another object is to provide a switch having a protective housing as a movable integral element of the switch.

Another object is to provide an automatic switch economical in construction and simple in design.

Another object is to provide a plunger actuated switch wherein the protective enclosure and switch elements are arranged in a novel manner to minimize material costs.

A still further object is to provide a switch wherein the elements are supported by an electric conductor leading from the switch.

The invention is illustrated in a preferred embodiment in the accompanying drawings, in which:

FIGURE 1 is a perspective view of a beverage warming stove illustrating the relative positions of the vessel support, plunger, and pilot lights;

FIGURE 2 is a partial and enlarged sectional view taken generally along line 2—2 of FIGURE 1, showing the heating shell and switch as supported by the stove framework, having the plunger and switch in the open position;

FIGURE 3 is a view like in FIGURE 2 but with the switch shown in the closed position;

FIGURE 4 is an end elevation view of the electrical bracket lead-in and terminal assembly taken from the right-hand side along line 4—4 as shown in FIGURE 2; and FIGURE 5 is a partial bottom view of the switch taken along line 5—5 as shown in FIGURE 2.

As disclosed in FIG. 1 of the drawings, the invention is embodied within a warming stove having two stations for heating beverage decanters. The warming stove operates generally by placing a decanter on the stove over one of the heating stations whereby the weight of the decanter depresses a plunger extending upwardly through the stove framework immediately beneath the vessel. The depressed plunger in turn actuates a control switch to turn on a corresponding heating element.

The embodiment incorporates a streamlined framework, constructed of any suitable sheet metal, to support the heating elements. In addition, a pilot light 48 is connected to each of the heating elements to offer constant visual indication of the on and off conditions of the stove.

Proceeding now in more detail, it can be seen from the drawings that a control switch generally designated 10, is electrically associated with a warming stove 11 having a heating element 12, shown in broken outline in FIG. 2. A circular shell 13 enclosing the heating element is recessed within the stove framework 14. A cover plate 15 fits over the shell top to form a circular platform for supporting decanters 49 (shown in broken outline in FIG. 3) in heating position, the circular edge 16 of which is supported by the stove framework.

The heating element is energized from any suitable electrical power source (not shown), the current passing into the switch 10 through push-on terminal 17 and from the switch into the heating element 12 through the strip conductor 18.

The switch 10 is seen to comprise an electrically conductive blade 19 mounted at an angle in relation to and extending beyond an electrically conductive blade 20. The blades each have normally spaced point contacts 21 and 22 which engage each other to transmit electrical current when the blades are brought into a closed position of the switch (as shown in FIG. 3). Thus blade 20 and contact 22 thereon define a first switch element 51, and blade 19 and contact 21 define a second switch element 52 normally spaced from and selectively engageable with switch element 51. Each blade is a thin strip of flexible conductive metal having a hole (not shown) at one end to be secured to mounting 24 supporting the blades in cantilever fashion. The mounting includes a screw 25 having circular insulating washers 26 fitted about the screw to space apart the blades and a nut 27 threaded on the screw end 45 to secure the mounting together. Also secured between the screw and nut is the electrical strip conductor 18 making contact with blade 19 by means of a conductive washer 28. It should be noted that the strip conductor, having sufficient rigidity, acts as the sole support for the switch assembly. The strip conductor extends downwardly for the mounting 24, and upwardly to the terminal lead-in 44 for the heating element 12 and a push-on terminal 51 leads out from the heating element.

Switch 10 is automatically adjusted to effect the on and off condition of the heating element by depression of a metal plunger 29 having a metal head 34. The plunger is slidably and guided in longitudinal movement by guides 30 and 31, guide 31 being a part of shell 13 and guide 30 being a part of cover plate 15. The plunger is preferably positioned to protrude through the shell at a point 46 out of coincidence with the center 47 of the cover plate 15. In the off position the actuator will extend a short distance above the cover plate 15 as shown in FIGURES 1 and 2. Placement of a decanter with beverage contents into heating position on cover plate 15 will depress the plunger 29 to actuate the switch. However, blade 19 has a particular stiffness which permits its being bent into contacting relationship with blade 20 only when a beverage decanter weighing more than a predetermined amount is placed in heating position. This prevents an empty decanter from being damaged by heat when placed on the stove.

One of the features of the present invention is concerned with protecting the switch from spilled fluids by means of a housing adapted to be a part of the switch.

The protective housing, or shield, is generally designated 36 and is shaped to enclose the space immediately adjacent the switch 10 without interfering with the operational movements of the switch blades. The enclosure has slanting end walls 37 and 38, vertical side walls 39 and 40 and a horizontal top wall 41. It may be molded or fabricated of a durable heat-resistant material, i.e., such as plastic. The housing has an internal molded block 50 to which the end 42 of blade 19 is secured by a screw 43.

To operate stove 11, a user merely places a vessel or decanter 49 in heating position on plate 15, as fragmentarily shown in broken outline in FIGURE 3, which depresses the plunger 29 and thereby tips the housing 36. The tipping of housing 36 downwardly deflects the movable contact blade 19 into the closed position of the switch. By removing the vessel or decanter, the plunger is free to use and thereby allow the housing to swing back into upright position by spring action of the upper blade 19, which assumes its upwardly angled position when freed to do so. The movement of the upper blade 19 to the angled position spaces contacts 21—22, thereby turning off the heating device 12.

While I have shown and described a preferred embodiment of my invention, it is to be understood that it is capable of many modifications. Changes, therefore, in the construction and arrangement may be made without departing from the spirit and scope of the invention as defined in the appended claims.

I claim:

1. In a beverage warming device having an electrical heating element, a switch operated by a plunger actuated by placement of a beverage decanter thereagainst in warming position, comprising, in combination: a first switch element; a second switch element supported in spaced relationship to said first switch element and selectively movable into electrical contacting relationship therewith; a non-conductive mounting insulatively carrying said switch elements; a protective housing to enclose the space immediately above and around said switch elements, said protective housing being integrally mounted on the second switch element and movable therewith; a plunger movable against said protective housing to tip said housing and thereby move the second switch element into engagement with said first switch element.

2. In a beverage warming device having an electrical heating element adapted for connection to a source of electrical energy, means controlling the supply of electrical energy to the heating element comprising, in combination, a rigid electrically conductive lead having one end electrically connected to one terminal of the electrical heating element, and a free end terminating in a plane spaced below the heating element, a first contact blade supported on the free end of said lead, a second resiliently flexible contact blade also supported on the free end of said lead and extending generally parallel to said first contact blade, said second contact blade being spaced from said first contact blade in its normal position, one of said contact blades being in electrical conductive relationship with said lead, the other being adapted for electrical connection to the electrical energy source, a protective housing enclosing the space immediately above and around said contact blades and supported solely by said second contact blade to be movable therewith, and a reciprocable control rod extending through the plane of the electrical heating element having its lower end resting on said housing and its upper end positioned for engagement and actuation by an object to be heated placed over the heating element whereby the presence of the object over the heating element actuates the rod to cause contact to be made between said contact blades, and absence of the object results in a breaking of the circuit at the contact blades.

3. In a beverage warming device having an electrical heating element, a switch comprising: a first contact member; a resilient second contact member supported in spaced relationship to said first contact member and selectively movable into electrical contacting relationship therewith; a mounting insulatively supporting said contact members; a protective housing to enclose the space above and around said switch, said protective housing being integrally mounted on the second contact member and movable therewith; a reciprocal plunger having one end resting on said housing and another end positioned for engagement by a beverage decanter placed in a warming position superjacent said heating element whereby the presence of the decanter in warming position depresses the plunger to move said housing and bend the second member into contact with said first member, said second contact member having a stiffness that prevents its bending sufficiently to close said switch unless a decanter having more than a predetermined weight is placed in warming position.

4. An electrical heating device comprising: a base; an element on said base arranged to provide a heating effect upon vessels placed thereover; a rigid electrically conductive lead mounted on said base having one end electrically connected to one terminal of the heating element and a free end terminating in a plane spaced below the heating element; switch means supported on the free end of said lead having one terminal connected to a source of electrical energy and carrying a swingable protective enclosure; and means for engaging said enclosure to actuate said switch means.

5. A device for controlling an electrical heating element, comprising: a pair of normally spaced, selectively engageable switch elements subjacent the heating element; a support fixedly supporting one switch element; means defining a downwardly opening concave shield overlying said switch elements and carried by the other of said switch elements; a plunger responsive to a vessel superposed to the heating element to move said shield and cause engagement of said other switch element with said one switch element; and means for conducting electrical energy through such engaged switch elements to the heating element.

6. The device of claim 5 wherein said support includes an electrically conductive portion connecting said other switch element and the heating element.

7. The device of claim 5 wherein said shield extends to below the horizontal plane of the lowermost portion of the switch elements.

8. The device of claim 5 wherein said shield includes a depending portion laterally outwardly of said switch elements effectively precluding liquid flow inwardly therefrom to said switch elements.

9. A switch to control an electrical device, comprising in combination: a fixed switch element; a movable switch element; a mounting for said elements normally supporting the same in out of contact relationship; means to enclose the space above and around said switch, said means being secured to said movable element for movement therewith; a plunger engaging said means to tip the same and thereby move said switch elements into contacting relationship; and an electrical conductor which supports said switch.

References Cited in the file of this patent

UNITED STATES PATENTS 2,155,425    La Mere  ------------  Apr. 25, 1939